Figure 1:
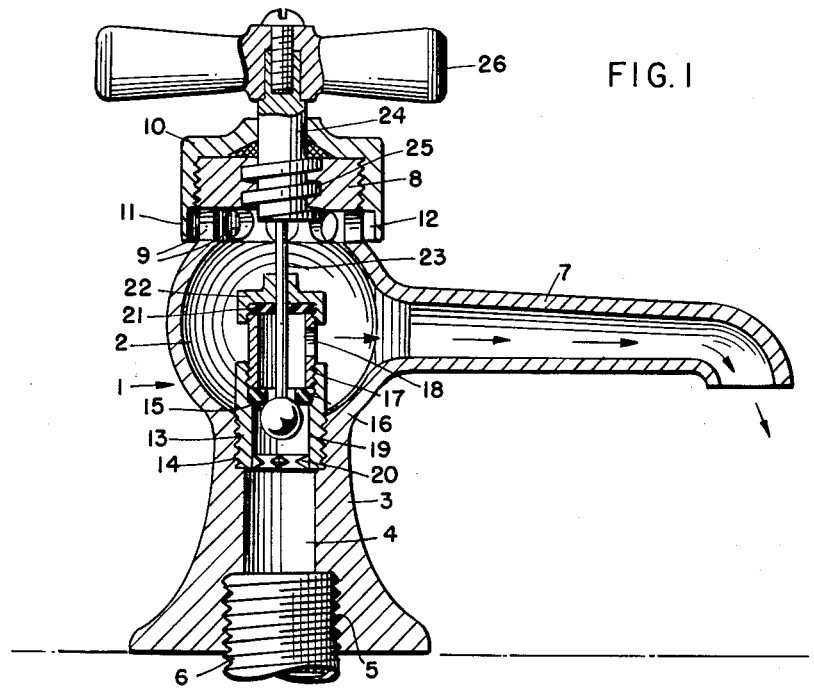

*INVENTORS:*
WILLIAM J. MARTIN
JOHN F. CLARK

BY *Marzall, Johnston, Cook & Root*
ATT'YS

2,740,421
VACUUM BREAKER FOR FAUCETS

William J. Martin and John F. Clark, Oak Park, Ill., assignors to Circle Valve Co., Chicago, Ill., a corporation of Illinois Application December 23, 1953, Serial No. 399,924

7 Claims. (Cl. 137—216)

This invention relates in general to a device for breaking a vacuum in liquid systems such as water systems where water flows under pressure and is directed particularly to a vacuum breaker for faucets utilized in such systems.

Since the present invention is directed to a vacuum breaker faucet structure, it has particular application to water systems and it will be described as such herein although it will be understood that the invention may be applied to a faucet utilized in connection with any liquid system where liquid flows under pressure and where a drop in such pressure is apt to create a vacuum in the system.

Water systems such as those utilized in domestic, commercial and industrial establishments are subject to pressure fluctuations and sometimes the pressure drop is sufficient to create a vacuum in the system. Such a pressure drop may occur for any one of several reasons. For example, many persons may be utilizing a quantity of water at the same time and thus the pressure throughout the entire system would be reduced. Also, it is not an infrequent occurrence that the water pump breaks down whereupon the pressure will drop. Furthermore, a domestic user may close one of the main water valves in the home which might create a pressure drop and a vacuum to occur in the system in which event water from another part of the system, such as the flush tanks in bathrooms, might be drawn into the system by such a vacuum.

Another danger results where the spout of the faucet may be submerged in water, such as when a bucket is placed thereunder. If a vacuum occurs in the system when the faucet is open and the spout is under water, then that water will be drawn into the system. If the water is dirty or otherwise contaminated, there may be serious results.

In our copending application Serial No. 399,923 filed December 23, 1953, there is disclosed a vacuum breaker device utilizing the same principle involved here but embodying a specifically different structure wherein it may be applied to the conduit through which a liquid flows. The present invention, however, is applied directly to the faucet of such a system.

One of the principal objects of the invention is to provide a faucet for water or other liquid systems having liquid under pressure flowing therethrough wherein a drop in pressure sufficient to cause a vacuum therein will immediately and automatically function to satisfy or dissipate the vacuum, thereby preventing liquid either from other parts of the system or from external sources from being drawn into the system.

Another object of the invention is to provide a water faucet wherein a drop in water pressure sufficient to cause a vacuum therein will automatically draw air into the conduit to which it is attached and thereby relieve the vacuum, thereby preventing a back-up of water into the system either from external sources or from other parts of the system.

A further object of the invention is to provide a water faucet having an inlet and an outlet and a chamber therein through which water may pass under pressure wherein valve means within the chamber may be closed to prevent flow of water or opened to permit flow of water, and wherein air vents are located in the chamber, whereby a drop in water pressure sufficient to cause a vacuum will draw air into the chamber and through the valve, thereby to dissipate or satisfy the vacuum.

A still further and more specific object of the invention is to provide a water faucet having an inlet and an outlet and a chamber therein through which water under pressure may pass wherein valve means within the chamber include a valve seat and a freely floating ball normally urged against the seat by the water pressure and which will drop away from the seat upon a drop in pressure sufficient to cause a vacuum and wherein air vents in the chamber will permit air to be drawn inwardly by the vacuum which will thereupon relieve or dissipate the vacuum therein.

Figure 2:
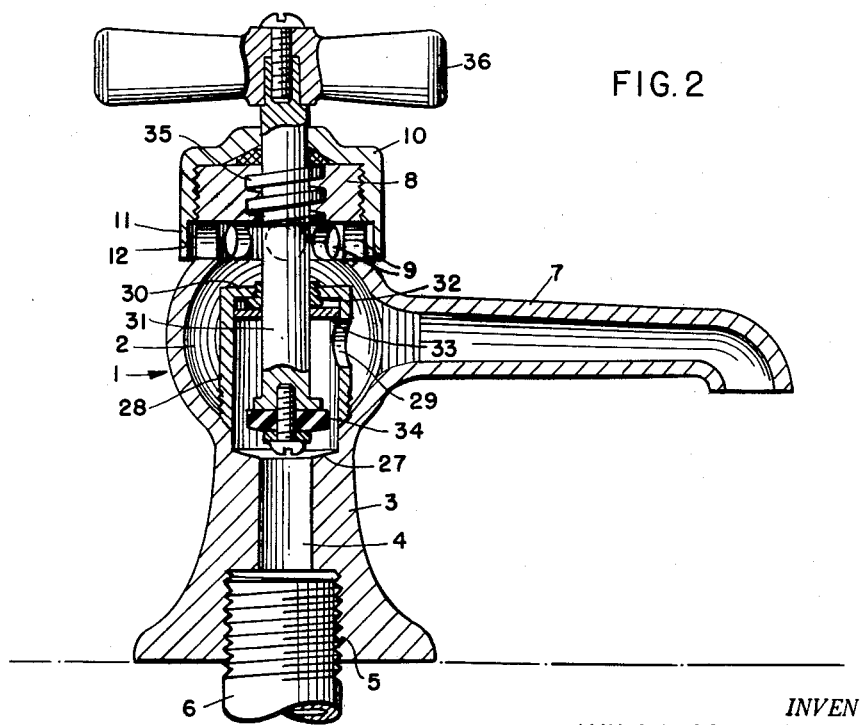

Other objects and advantages of the invention will become apparent upon reading the following description taken in conjunction with the accompanying drawing, in which Fig. 1 is a vertical sectional view through a water faucet embodying the present invention and illustrating one type of valve therein, and Fig. 2 is a view similar to Fig. 1 but illustrating a different type of valve mechanism.

Briefly described, the invention involves a faucet design wherein a chamber has in communication therewith an inlet and an outlet for water under pressure. A valve is provided which may be operated to be closed and thus prevent the flow of water therethrough or opened to permit the flow of water. The chamber is also provided with a plurality of air vents for the purpose of allowing air to be drawn therethrough and into the chamber when a drop in water pressure is sufficient to create a vacuum. Thus, if the valve is open and such a drop in water pressure occurs, air will be drawn inwardly into the system to dissipate or satisfy the vacuum before any water, either from external sources or from other parts of the system, can be drawn into the water supply conduit.

According to one form of the invention a conventional valve may be utilized in which event the vacuum breaker would be effective only when the valve is open. The other and preferred form of the invention utilizes a ball check valve which will open automatically upon a drop in pressure so that the air will be drawn inwardly as soon as a vacuum is created regardless of whether the valve has been manually opened or is in its normally closed position.

Referring now particularly to the drawing and especially to Fig. 1, the faucet structure embodies a main body portion generally indicated by the numeral 1. The body is shaped to provide a chamber 2 which communicates with the inlet and outlet as will be presently seen. The lower part of the body has an extension 3 formed integral therewith through which the inlet passage 4 extends. This inlet passage 4 is enlarged at its lower end and may be internally threaded as shown at 5 to threadedly engage the end of an inlet conduit 6.

An outlet passage in the form of a spout 7 also communicates with the chamber 2 at one side thereof. The upper part of the faucet body preferably extends upwardly as indicated by the numeral 8 and is provided with a plurality of circumferentially spaced openings 9. These openings 9 are air vents and communicate with the chamber 2 so that under proper conditions air may pass through the openings and into the chamber.

The upper part of the faucet body is provided with a cap 10 which threadedly engages the extension 8 and which at its lower end has the wall thereof formed of less thickness as shown at 11 so as to provide an annular space 12 between the wall and the air vents 9.

A valve mechanism is located within the chamber to control the flow of water under pressure therethrough. In Fig. 1 this valve mechanism includes a tubular member 13 which threadedly engages the enlarged inner end 14 of the inlet passage. This tubular member 13 extends upwardly for a short distance into the chamber 2 and is provided with an internal shoulder 15 spaced a suitable distance downwardly from the upper end thereof. A valve seat 16 rests upon the shoulder 15 and is held in place by an inner tubular member 17 threadedly engaging internal threads on the member 13. An opening 18 is provided through the wall of the tubular member 17 which opening is in alignment with the outlet passage or spout 7.

A freely floating closure member such as the ball 19 is located within the tubular member 13 and is normally in sealing engagement with the seat 16 by reason of the pressure of the water in the inlet passage 4. A spider or other type of perforated support 20 is positioned at the lower end of the tubular member 13 which permits the flow of fluid therethrough and also acts as a stop or support member for the ball 19 when it is caused to drop downwardly due to a drop in water pressure.

The upper end of the inner tubular member 17 is closed by means of a washer 21 held in place by a cap 22. A valve operating stem 23 extends downwardly through the cap 22 and washer 21 to the valve seat 16 and is adapted to be moved downwardly to unseat the ball 19 and permit the flow of water therethrough or to be moved upwardly to its normal position as shown in Fig. 1, which will permit the water pressure to urge the ball into sealing engagement with the seat 16.

The stem 23 may be secured to or formed integral with the rod 24 which has threads 25 thereon engaging similar threads in the upper extension 8 of the main faucet body. A suitable handle 26 is fixed to the upper end of rod 24 whereby rotation thereof will cause vertical reciprocation of the stem 23 either downwardly or upwardly for the purpose of opening or closing the valve.

In the normal operation of the structure shown in Fig. 1 with normal water pressure the ball 19 will be held in closed position against the valve seat 16 by means of the water under pressure. Manipulation of the handle 26 to impart a downward movement to stem 23 will urge the ball 19 away from seat 16 whereupon water under pressure will flow through the valve and will be directed outwardly through the opening 18 somewhat in the form of a jet and outwardly through the outlet passage or spout 7. Rotation of the handle 26 in the opposite direction will move the stem 23 upwardly and permit the water pressure to close the valve by moving the ball 19 into sealing engagement with the valve seat 16.

When a condition exists in the water system which causes a drop in pressure sufficient to create a vacuum therein, the ball 19 will immediately drop downwardly to the spider 20 whereupon the vacuum in the system will draw air inwardly through the air vents 9 into the chamber and through the opening 18 into the inlet passage 4. This incoming air will thereupon dissipate or satisfy the vacuum and will thus prevent the vacuum from drawing into the system any water or other liquids which might possibly be contaminated either from other parts of the system or from external sources through the spout 7. Upon relieving the condition which created the vacuum and the return of the water pressure to normal, the ball 19 will immediately be again urged into sealing contact with the seat 16 and the system will thereafter function in the normal manner.

The same sequence of events will occur if the vacuum in the system should be created while the valve is open.

A valve structure as above described and as illustrated in Fig. 1 which permits water to flow through the opening 18 somewhat in the form of a jet has been found to produce a suction sufficient to draw air through the air vents 9 and aerate the water. This is a condition which has certain advantages from the standpoint that it creates a soft water effect and the water passing outwardly through the spout will not splash as readily. If, however, the aerated condition of the water is deemed undesirable, then a short pipe extending from the opening 18 for a short distance into the outlet passage or spout 7 will eliminate this effect without in any way diminishing the effectiveness of the vacuum breaking function.

In Fig. 2 the invention is illustrated as applied to a water faucet having a conventional valve means therein. The main body portion of the faucet is substantially identical with that described above and is, therefore, again generally indicated by the numeral 1. The faucet body may be provided with the same chamber 2, downward extension 3 and inlet passage 4 which is enlarged as at 5 to receive the end of a conduit 6.

The main body also has the outlet passage or spout 7 communicating with the chamber 2 and the upward projection 8 having the circumferentially spaced openings 9 therein. The cap 10 may be formed in the same way by being provided with a skirt 11 around the lower end thereof so that the annular space 12 allows air to pass inwardly through the air vents 9.

In this form of the invention, however, the inner end of the inlet passage 4 is enlarged and sloped upwardly as at 27 to provide a valve seat which may be closed to stop the flow of water. A tubular member 28 is disposed within the chamber 2 and communicates with the inlet passage 4. An opening 29 in the wall of member 28 is disposed in alignment with the outlet passage or spout 7 whereby water under pressure flowing from the inlet passage 4 will pass outwardly through the opening 29 and into the spout 7. The upper end of tubular member 28 is substantially closed as at 30 except for an opening therethrough which permits passage of the rod or valve stem 31. A suitable washer 32 and retaining ring 33 prevent water from passing upwardly through the member 28 and form a guide for the valve stem 31.

The lower end of stem 31 is provided with a washer 34 adapted to be moved into sealing engagement with valve seat 27 thereby to prevent any flow of water. The upper part of valve stem 31 is provided with threads 35 which engage complementary threads in the projection 8 whereby rotation of the stem will move washer 34 either toward or away from the seat 27. A handle 36 is fixed to the upper end of valve stem 31 for manual operation thereof.

In this form of the invention when the valve is closed by reason of the washer 34 being in sealing engagement with the valve seat 27 a drop in pressure sufficient to create a vacuum will not cause the vacuum breaker of the invention to function. If, however, the valve is open during the time that the vacuum is in the system, or if the vacuum occurs while the valve is open, then such vacuum will draw air through the air vents 9 in the manner explained above whereupon the air will enter the system and satisfy or dissipate the vacuum therein.

It will thus be seen that in either form of the invention the vacuum breaker herein will function to dissipate a vacuum in the water system thus preventing water or other liquids contaminated or otherwise from entering the system either from external sources or from other parts of the system. The valve must be open in order for the vacuum breaker to function and the only difference between the two forms of faucet is that in one case the valve must be opened manually, whereas in the other case the valve will open automatically upon a drop in water pressure.

The invention functions on the premise that it is better to have air in the system than contaminated water and since the vacuum must be satisfied in some way, it is better to utilize air for this purpose than to permit it to be satisfied by drawing in contaminated liquids. It is thus apparent that the invention herein satisfies a long-felt need to overcome the disadvantages inherently present in water systems when a vacuum is created therein due to a drop in the pressure.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. A vacuum breaker water faucet adapted to be connected to a conduit having water under pressure therein, comprising, a main body portion having a water inlet and a water outlet, a stationary hollow valve device secured within said body in communication with said inlet and having an opening therethrough directed toward said outlet, movable valve means within said device, means for moving said movable valve means to open position to permit water under pressure to flow therethrough, and a plurality of air inlet openings through the wall of said body and communicating directly with the atmosphere, whereby a drop in water pressure sufficient to cause a vacuum in the conduit will draw air through said air inlet means and into the conduit to dissipate the vacuum therein.

2. A vacuum breaker water faucet adapted to be connected to a conduit having water under pressure therein, comprising, a main body portion having a water inlet and a water outlet, a stationary hollow valve device secured within said body in communication with said inlet and having an opening therethrough directed toward said outlet, movable valve means within said device, means including a manually operable stem for moving said movable valve to open position to permit water under pressure to flow therethrough, and a plurality of air vents in the wall of said body around said stem, whereby a drop in water pressure sufficient to cause a vacuum in the conduit will draw air through said vents and into the conduit to dissipate the vacuum therein.

3. A vacuum breaker water faucet adapted to be connected to a conduit having water under pressure therein, comprising, a main body portion having a chamber therein, a water inlet passage communicating with the lower part of said chamber, a water outlet passage communicating with said chamber at one side thereof, a valve structure including a fixed tubular member positioned within said chamber at the juncture of said chamber and inlet passage, a stem extending downwardly through the upper part of said chamber and through said valve structure for operating said valve structure, and a plurality of air vents in the walls of said chamber around said stem and communicating with said chamber and with the atmosphere at all times, whereby a drop in water pressure sufficient to cause a vacuum in the conduit will draw air through said vents and into the conduit to dissipate the vacuum therein.

4. A vacuum breaker water faucet adapted to be connected to a conduit having water under pressure therein, comprising, a main body portion having a chamber therein, a water inlet passage communicating with the lower part of said chamber, a water outlet passage communicating with said chamber at one side thereof, a tubular member extending upwardly within said chamber and secured in place at the inlet end of said inlet passage and communicating therewith, closure means at the upper end of said tubular member, a valve structure within said tubular member adapted to be closed to prevent the flow of water therethrough and to be opened to permit the flow of water therethrough, an opening through a wall of said tubular member in alignment with said outlet passage, whereby water under pressure will be directed from said inlet passage through said tubular member and to said outlet passage when said valve is open, and a plurality of air vents through the walls of said chamber in the upper portion of said main body and communicating with said chamber and with the atmosphere at all times, whereby a drop in water pressure sufficient to cause a vacuum in the conduit will draw air through said vents and into the conduit to dissipate the vacuum therein.

5. A vacuum breaker water faucet adapted to be connected to a conduit having water under pressure therein, comprising, a main body portion having a chamber therein, a water inlet passage communicating with the lower part of said chamber, a water outlet passage communicating with said chamber at one side thereof, a tubular member extending upwardly within said chamber and secured in place at the inlet end of said inlet passage and communicating therewith, closure means at the upper end of said tubular member, a valve structure within said tubular member including a valve seat and a floating member therebelow normally urged against said seat by the water pressure for closing the valve, an opening through a wall of said tubular member above said seat and in alignment with said outlet passage, means to move said floating member away from said seat to permit water under pressure to flow from said inlet passage through said tubular member and to said outlet passage, and a plurality of air vents in the upper portion of said main body communicating with said chamber, whereby a drop in water pressure sufficient to cause a vacuum in the conduit will draw air through said vents and into the conduit to dissipate the vacuum therein.

6. A vacuum breaker water faucet adapted to be connected to a conduit having water under pressure therein, comprising, a main body portion having a chamber therein, a water inlet passage communicating with the lower part of said chamber, a water outlet passage communicating with said chamber at one side thereof, a tubular member extending upwardly within said chamber and secured in place at the inlet end of said inlet passage and communicating therewith, closure means at the upper end of said tubular member, a valve structure within said tubular member including a valve seat and a floating member therebelow normally urged against said seat by the water pressure for closing the valve, an opening through a wall of said tubular member above said seat and in alignment with said outlet passage, means to move said floating member away from said seat to permit water under pressure to flow from said inlet passage through said tubular member and to said outlet passage, and a plurality of air vents in the upper portion of said main body communicating with said chamber, whereby a drop in water pressure sufficient to cause a vacuum in the conduit will draw air through said vents and into the conduit to dissipate the vacuum therein, and stop means to limit the downward movement of said floating member when said drop in water pressure occurs.

7. A vacuum breaker water faucet adapted to be connected to a conduit having water under pressure therein, comprising, a main body portion having a chamber therein, a water inlet passage communicating with the lower part of said chamber, a water outlet passage communicating with said chamber at one side thereof, a tubular member extending upwardly within said chamber and secured in place at the inlet end of said inlet passage and communicating therewith, closure means at the upper end of said tubular member, a valve structure within said tubular member including a valve seat formed by the juncture of said inlet passage with said chamber, and a closure member positioned above said seat, an opening through a wall of said tubular member above said seat and in alignment with said outlet passage, means to move said closure member toward and away from said seat either to prevent or permit the flow of water therethrough and through said opening to said outlet passage, and a plurality of air vents in the upper portion of said main body communicating with said chamber, whereby a drop in water pressure sufficient to cause a vacuum in the conduit will draw air through said vents and into the conduit to dissipate the vacuum therein.

References Cited in the file of this patent

UNITED STATES PATENTS

| | | |
|---|---|---|
| 599,256 | Rowe | Feb. 15, 1898 |
| 791,256 | Durrant | Feb. 17, 1904 |
| 1,768,184 | Wolff | June 24, 1930 |
| 1,962,558 | Guildford | June 12, 1934 |
| 2,133,804 | Brooks | Oct. 18, 1938 |
| 2,187,964 | Brown | Jan. 23, 1940 |
| 2,188,761 | Peterson | Jan. 30, 1940 |
| 2,282,338 | Moody | May 12, 1942 |
| 2,661,759 | Hansen | Dec. 8, 1953 |

FOREIGN PATENTS

| | | |
|---|---|---|
| 334,615 | Italy | 1936 |